Figure 1:
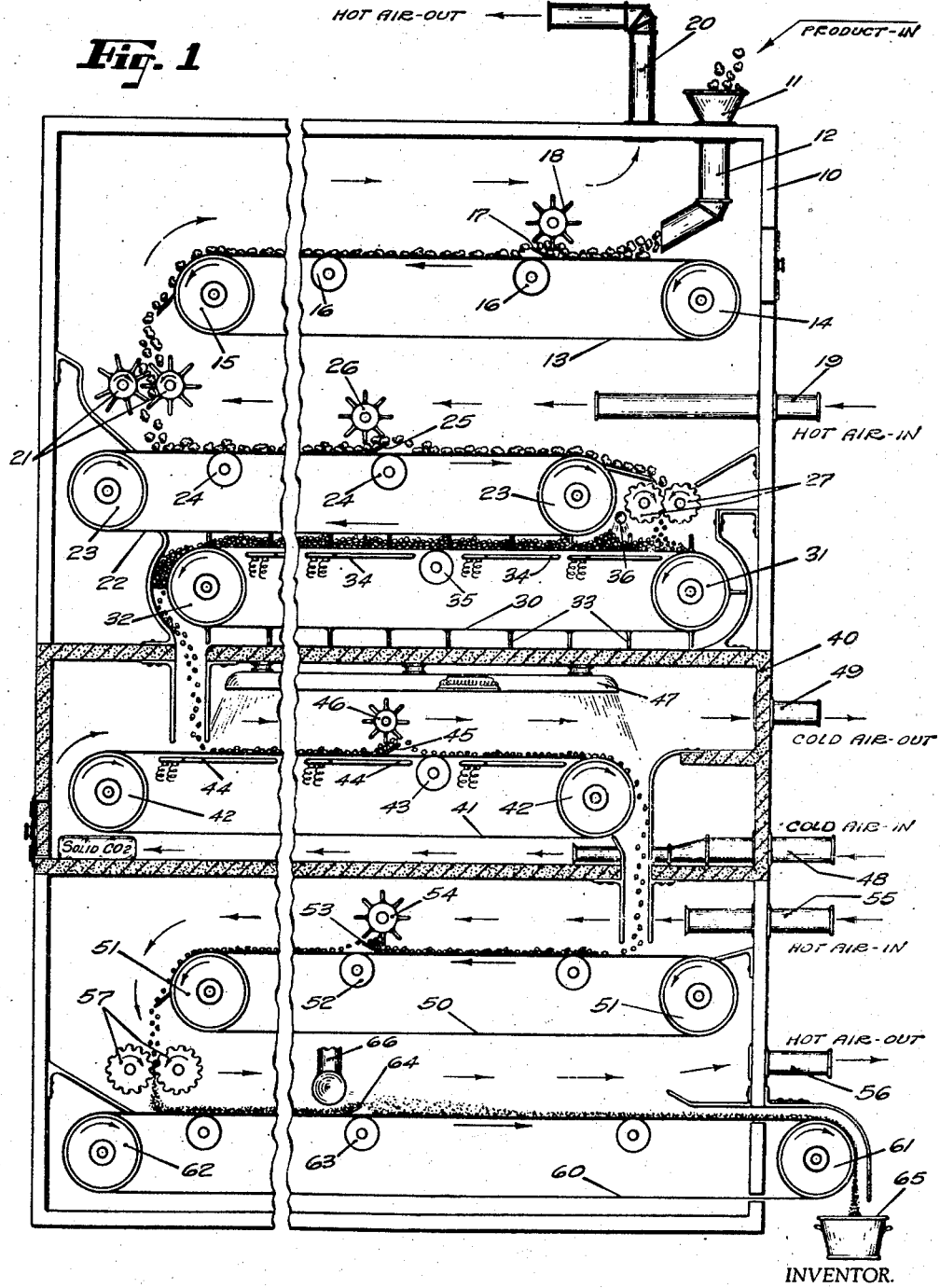

Nov. 2, 1948.  C. BIRDSEYE  2,452,983
PROCESS OF DESICCATING FOOD PRODUCTS
Filed Dec. 29, 1941  2 Sheets-Sheet 1

INVENTOR.
BY Clarence Birdseye

Nov. 2, 1948.                C. BIRDSEYE                2,452,983
                    PROCESS OF DESICCATING FOOD PRODUCTS
Filed Dec. 29, 1941                                 2 Sheets-Sheet 2
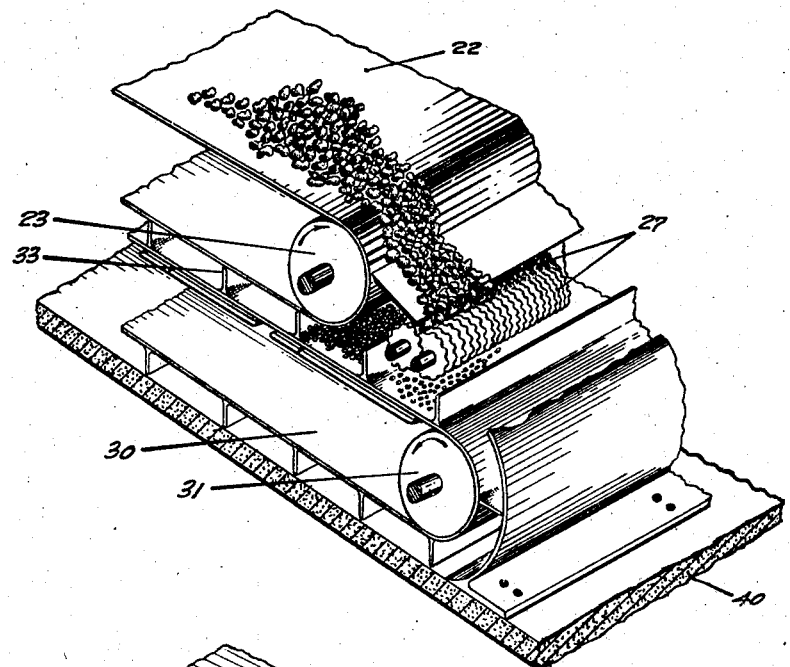
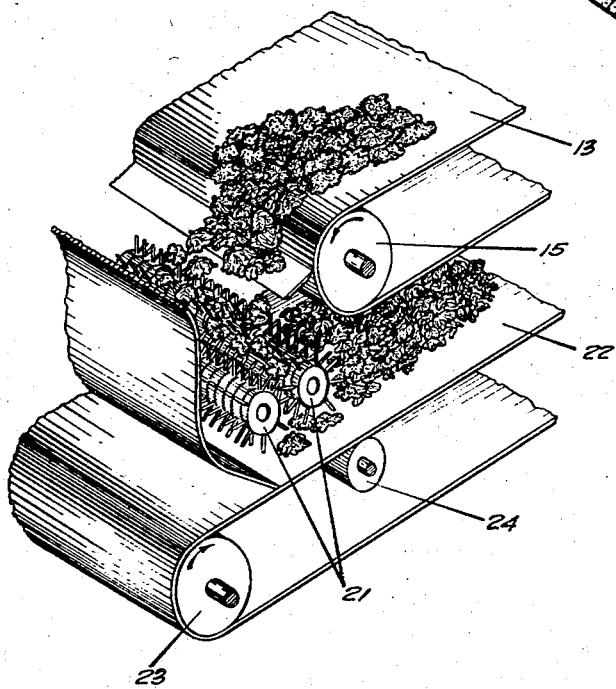
INVENTOR.
Clarence Birdseye
BY Patented Nov. 2, 1948

2,452,983

UNITED STATES PATENT OFFICE 2,452,983

PROCESS OF DESICCATING FOOD PRODUCTS

Clarence Birdseye, Gloucester, Mass., assignor to Dehydration, Inc., Gloucester, Mass., a corporation of Massachusetts Application December 29, 1941, Serial No. 424,834

4 Claims. (Cl. 99—204)

This invention relates to the preparation of dried food products from vegetables, fruits, and other moist, moisture-containing or liquid comestibles. It consists in an improved process of and apparatus for drying such products with facility and efficiency while at the same time producing dried or dehydrated products improved in many important respects over those heretofore available as a result of commercial practice.

The value of dried foods has been appreciated for many years, and much effort has been expended to the end that the drying operation might be carried out with ever greater efficiency and in such manner as to retain in the final product excellent food values and other desirable characteristics. Three important difficulties experienced heretofore have been "case-hardening"; the development of off-flavors, colors and odors; and the loss of vitamin values.

Case hardening is the formation of a dry, porous layer on the outside surfaces of the individual units of the food being dried. This porous layer has the effect both of slowing up the drying process and requiring a prolonged soaking and cooking to render the dehydrated product fit to eat. Heretofore, case-hardening has been combated principally by rigid control of humidity within very narrow limits during the dehydration process. Such control is of itself costly and its practice necessarily prolongs the drying period and so further increases the cost of the dehydrated product.

The loss of flavor, color, odor, vitamin value and other desirable characteristics of the fresh product is most often due to oxidation or other chemical changes, and these undesirable changes may occur either during the drying process or subsequent storage. Many of these changes are caused or aggravated by excessive heating and over-desiccation of the product during dehydration.

The primary object of the present invention is to produce dehydrated food products of high vitamin value, free of case-hardening and off-flavors, colors and odors, and to effect this desirable result with speed and efficiency under practicable operating conditions.

The process of my invention is characterized in part by three steps which may be repeated, alternated and rearranged in their order in accordance with the product being treated and with the degee of dehydration it is desired to secure. These steps are, first, the employment of a rapid current of hot, dry gas in the initial stages of dehydration, usually continued until the smaller or finer units of the product have been substantially dehydrated throughout and the larger units have been largely surface dried. Then, without regard to order, is included the step of holding the partially-dried mass of units in a still, moisture-saturated atmosphere until the initial moisture content has become distributed substantially evenly throughout the entire mass of units and the surfaces of all the units have again become equally moist. Thirdly, is included the step of subjecting the moisture-equalized product units to a rapid current of dehydrating gas which again evaporates moisture rapidly from all the surfaces and simultaneously cools these surfaces so that there is little danger of even the small, thin pieces of the product, such as pieces of leaves, being scorched or otherwise damaged.

An important feature of my improved process, contributing largely to the desired results, comprises as one stage of treatment, the step of simultaneously chilling the surface of the product by means of a current of gas cooler than the product and preferably at the same time heating the product by means of radiant energy or otherwise so as to heat the interior of the individual pieces or units of the product and thereby hasten the passage of moisture to the surface.

In general it may be said that the drier the product, the greater the danger becomes that when it is exposed to very hot dry gas it will be overheated or over-dried in spite of any precautions that may be taken. Accordingly when the product has been partially dehydrated by exposure to hot dry gas in the manner above explained, I propose that it be further dried by exposure to a current of relatively cool dry gas and simultaneously subjected to radiant energy which, upon absorption, will heat the interior of both the product and the individual units of the product so that evaporation will continue to be relatively rapid even at the low temperatures employed. During exposure to the cool gas and radiant energy some of the thinner and smaller pieces of product may become substantially dried, but there is practically no danger of their being overheated for they are constantly bathed in and cooled by the cool gas current. Of course, heat may be supplied to the product in any manner—by radiation, conduction or convection. The point is that during this step or phase of the process, the product preferably is warmer than the gas surrounding it while in other stages the gas is warmer than the product.

As herein shown both the preliminary heat drying steps and the later step of drying in a cold gas current may be carried out consecutively or alternately by moving the product to be treated continuously on conveyors through adjacent zones in which the respective steps are carried out. This has the further advantage of providing opportunity for agitating, rearranging, cutting or performing any other desired operations on the product, all without interrupting its continuous passage along a predetermined path at a uniform or variable rate of travel. Further, I contemplate the employment of an air current to pick up and advance dried particles of the product at a faster rate than the heavier and incompletely dried product on the conveyor surfaces, thus avoiding the unnecessary further heating of the already-dried portions of the product.

An important result of the chilling step is that the product, which may be limp or flabby when heated, is thereby rendered crisp and brittle. I have discovered that it may be maintained in this desirable crisp condition by a further heating or warming step sufficient to prevent condensation upon the product from the surrounding atmosphere and thereby simultaneously removing still more moisture from the product.

An important characteristic of my improved process consists in fractionating or reducing the size of the product units from time to time or periodically throughout the dehydrating process. The rate of moisture loss throughout the drying process is a paramount factor in successful low cost production of high quality dried fruits and vegetables. This moisture loss is largely in proportion to the surface-to-bulk ratio of the product units exposed to the dehydrating gas, the temperature differential between the product and the gas, the speed and relative humidity of the gas, and the degree to which the gas current penetrates the product mass and reaches the surfaces of the individual units. Dehydration is retarded by the progressive formation of a dried spongy surface layer on the product units, the nature of this layer being such that moisture from the interior of the product can penetrate through the layer to the surface only very slowly.

Rapid evaporation of moisture cools both the product and the atmosphere immediately adjacent to it, and therefore permits the use of very hot dry gas at the beginning of the dehydration process. But as the product surfaces become drier the speed of evaporation decreases and lower gas temperatures must be employed to prevent scorching and case hardening of the product surfaces.

Vegetable matter should not be too finely comminuted before entering the dehydration apparatus, because if it is presented in very small pieces it forms a compact, soggy mass which so thoroughly resists penetration by the gas that only a very small proportion of the total surface area is exposed to dehydration. That is why most of the vegetables at present commercially dehydrated are dried in relatively large pieces and then broken or shredded after the drying process is completed.

My process is successful in part because by periodically dividing the product units as dehydration takes place, I obtain the following advantages among others: the product mass is at no time densely compacted; freshly cut product surfaces are repeatedly presented to the dehydrating gas; evaporation is frequently renewed at a high rate until the drying is completed; very hot gases may therefore be used throughout the drying process to dry the then-exposed product surfaces rapidly and substantially without scorching the product; harmful case hardening is prevented; the product is dried with extreme rapidity but at relatively low temperatures and is therefore of very high quality; and the apparatus has a large capacity in proportion to its size and cost.

My invention also contemplates a fluffing with or without slight compressing of the product during its passage through the dehydrating field to facilitate fuller and more uniform contact of the drying medium with the moisture to be evaporated and, furthermore, utilizes a variation of the speed of the product through the drying channel and a variation of the speed of the drying gas relative to the product whereby more efficiently to regulate the dehydrating action as dehydrating and sub-dividing of the product progresses. The variation in speed of the product is effected by operating the conveyors at individually controlled speeds and this action serves to vary the unit area amount of food carried by the conveyors as the food is deposited from each conveyor to the next succeeding conveyor, all for the purposes hereinafter described.

While the above described features are particularly pertinent to the dehydrating of fruits and vegetables, my invention is not limited to any particular product and is useful in the drying of such flesh products as sea foods and meats as well as such delicate products as vitamin compounds. Some such products (mackerel, fatty meats, etc.) may contain considerable oil or fat which would tend to oxidize during dehydration and a further feature of the invention contemplates the treatment of such products with an anti-oxidant before and/or during dehydration to inhibit such oxidation.

As a further means to prevent oxidation I propose that, when certain fruits and flesh products are being dried, the atmosphere within the drying apparatus shall be substantially wholly of an inert gas, such as nitrogen or $CO_2$ which may be supplied by the sublimation of dry ice or otherwise. I propose to maintain such an atmosphere within the apparatus by maintaining an internal pressure slightly in excess of that of the atmosphere surrounding the apparatus, thus causing any leakage to be outwardly. In this manner I not only avoid the necessity of making the apparatus airtight, but also gain the advantage of a constant purification and renewal of the gas within the machine.

My invention contemplates, as an optional but important and valuable feature, the preparation of dehydrated food products with an edible wetting agent or agents. The presence of a wetting agent is beneficial in improving both the efficiency of the dehydrating process and the speed of rehydration and consequently increasing the quantity and desirability of the product. For example, if a wetting agent is preliminarily added to the moist product the liquid contained in the product will pass out freely from its capillary passages to its outer surface thereby facilitating rapid evaporation. On the other hand if the dehydrated product contains a dried wetting agent thereon or therein, rehydration is expedited when the product is being prepared to be consumed. I have discovered that these desirable results may be achieved by immersing or spraying the fresh product with a solution containing a wetting agent, or by distributing a wetting agent in solution throughout the product when partially dried or at any time before it is packed and fixing the wetting agent upon or within the product by drying. This feature of my invention is not herein claimed, but forms the subject matter of my copending application, Ser. No. 460,123, filed September 29, 1942, now abandoned.

The characteristics and advantages of my invention will be best understood and appreciated from the following descprition of one satisfactory form of apparatus for carrying out the same and the manner of its use as shown in the accompanying drawings in which, Fig. 1 is a diagrammatic view of the entire apparatus, Fig. 2 is a view in perspective illustrating the comminuting mechanism of the apparatus and adjacent parts, and Fig. 3 is a view in perspective of the fluffing or separating mechanism of the apparatus and adjacent parts, shown as operating on a leaf product like spinach.

The apparatus herein shown is assembled within a casing 10 and may be provided with doors and side openings wherever convenient. The apparatus has a series of horizontal conveyor belts located one above another and arranged to deliver the product being treated from one to the next. The fresh moist product is delivered to the apparatus by means of a hopper 11 and inlet duct 12 in the upper right hand corner of the casing 10. From the duct 12 the product passes to the surface of a conveyor belt 13, carried and driven by pulleys 14 and 15 so that its product supporting face moves from right to left and is supported at suitable intervals by idle rolls 16. Adjacent to one of these rolls is located a scraper blade 17 which is set at an acute angle to the belt with its lower edge in scraping contact therewith and serving to separate the fresh moist product from the surface of the belt and carry it upwardly within the range of a rotary spreading and separating roll 18. The latter is provided with rows of resilient spikes or arms and is driven in the proper direction to engage the product as it is elevated by the blade 17, separating pieces from the mass and throwing them upwardly and forwardly on to the belt so as to break up and lighten the mass of the product or to shred it in case of a product like spinach.

A further effect of the separating roll 18 is to throw the product into a current of warm dry air or gas which is admitted to the casing through an inlet duct 19 located beneath the belt 13 and drawn out of the casing through an outlet duct 20 located adjacent to the delivery hopper 11. If desired, an inert or non-oxidizing gas may be employed to make up the gaseous drying current in the apparatus at this stage of the process.

The preliminary stage of the drying process is thus carried out upon the belt 13 and the product now passes from the left hand end of the belt and falls downwardly between suitable guide plates and into the bite of a pair of fluffing or separating rolls 21 where again the mass of the product is lightened and broken up, and in some cases shredded or comminuted to some extent. The rolls 21 may have the effect of instantaneously compressing the pieces of the product tending to squeeze moisture therein to the surface where it remains until pressure is relaxed. Upon leaving the rolls 21 the product falls upon the upper product-supporting surface of a second conveyor belt 22 running over and driven by pulleys 23 and supported in its upper reach by idle rolls 24. Partially dried product is carried by this belt toward the right where it encounters a scraping blade 25 similar to the blade 17 already described, this blade being arranged in cooperation with a fluffing and separating roll 26 which acts to lighten and break up the mass of the product and to throw it into the path of the hot air current delivered through the inlet duct 19. The product on the belt 22 encounters the gaseous drying current in counter-flow direction, whereas on the belt 13 the gaseous current overtakes the product.

After passing off the right hand end of the belt 22 the product is guided so that it falls into the bite of a pair of cutting rolls 27 comprising a series of sharp disks, set close together in alternate arrangement as well shown in Fig. 2 so that the product in passing through them is cut up into small pieces of substantially uniform size. The two drying steps above described together with the accompanying separating, fluffing and comminuting steps may be arranged as to their location to suit the requirements of the particular product being dried and local conditions encountered. For example, the comminuting step may be carried out upon the product as it leaves the first conveyor belt of the series, the conveyor belts may be driven at different rates of speed so that throughout selected parts of the process a thicker or thinner layer of product may be carried upon the surface of the respective conveyor belts, and, of course, any desired or convenient number of conveyor belts may be employed in any selected operation of the process.

Upon passing through the cutting rolls 27 the product falls upon the surface of a conveyor belt 30 carried and driven by pulleys 31 and 32, and differing from the belts already described in that it is provided with a series of upright partitions 33 which, in cooperation with the lower reach of the belt 22, form a series of closed chambers or compartments in which the comminuted and partially dried product is conveyed from right to left.

Beneath the upper reach of the belt 30 is provided a series of heaters herein shown as elongated electric heaters 34 placed close beneath the belt and continuous, except for short gaps in one of which is shown a supporting idle roll 35 which is useful in keeping the upper reach of the belt 30 in such position that the edges of the partitions 33 substantially contact with the lower reach of the belt 22. It is during its passage in the compartments of this belt that the product is subjected to a sweating operation. By the time the comminuted product reaches this belt its surface is substantially dry and in the sweating step occurs an equalization of the moisture in the product, that in the interior of the pieces passing outwardly to the surface from which it may be efficiently evaporated in the subsequent steps of the process and that in the moister pieces passing to the drier pieces.

If desired, the step of adding a wetting agent to the product may be carried out at this stage of the process, and for this purpose a transverse spray pipe 36 is shown as located between the right hand pulley 23 and the cutting rolls 27. This is provided with spray orifices through which a solution containing a suitable edible wetting agent, such as sulphanated alcohol, may be delivered to the product and distributed throughout it during the sweating step of the process.

On passing from the compartments of the belt 30, from the left hand end of the belt, the product falls downwardly in the path controlled by suitable guide plates and baffles into a chilling compartment 40 having insulated walls and containing the conveyor belt 41 carried on and driven by pulleys 42 and supported in its upper reach by an idle roll 43. Heating means comprising electric heaters 44 are arranged close beneath the upper reach of the belt 41, and a scraping blade 45 and fluffing or separating roll 46 of the character already described are located in operative relation to the upper reach of the belt 41 adjacent to the supporting roll 43. In the upper part of the chilling compartment is provided an elongated electric radiant heater 47 which includes a suitable reflector and is arranged to direct all its energy in the form of radiant heat upon the comminuted product which is moved from left to right upon the upper reach of the belt 41. Cooled, dehydrated air is admitted to the compartment 40 by an inlet duct 48 herein shown as located in its lower right hand corner, and the cooled air is exhausted through the outlet duct 49 leading out from the upper part of the compartment.

In this step of the process, as already explained, the warm, moist, comminuted product coming from the sweating step in limp condition is chilled and converted to a crisp, brittle condition. Surface moisture is evaporated in the cooled dehydrated gaseous current to which the product is subjected, and into which it is thrown by the blade 45 and the separating or fluffing roll 46. At the same time the product is internally heated by the radiant energy of the heater 47 so that, in effect, the contained moisture of the product is boiled out to the surface of the pieces or particles where it is readily accessible to be picked up by the cooled air current.

If desired this step of the product may be carried out under less than atmospheric conditions, and $CO_2$ or other inert gaseous mixture may be employed instead of air. In this step of the process, moreover, the wetting agent which has been distributed in liquid form upon and throughout the product is fixed by being dried upon or within it.

When the product has completed its passage upon the belt 41 it passes downwardly at its right hand end upon the surface of the belt 50, supported and driven by pulleys 51 in the lower section of the casing. The belt 50 is supported in its upper reach by idle pulleys 52 and is provided with a scraper blade 53 and separating or fluffing roll 54 of the character already described. In its passage upon the belt 50 the product is subjected to a parallel-flow or overtaking current of hot air or gas delivered through an inlet duct 55 in the upper right hand corner of the section, and drawn therefrom through an outlet duct 56 located above the lower right hand corner of the casing.

In passing from the left hand end of the belt 50 the product is suitably guided to the bite of a pair of grinding rolls 57 and in passing through these rolls the product is ground to the particle size desired in the final product. The action of the grinding rolls 57 supplements and carries forward that of the cutting rolls 27 which have already reduced the product into small pieces.

Upon leaving the grinding rolls 57 the ground product falls upon the upper surface of a final conveyor belt 60 of the series. This is supported and driven by a pulley 61 located outside the casing and a corresponding pulley 62 located inside the casing. It is supported in its upper reach by idle pulleys 63, and provided with a scraping blade 64 above one of its idle pulleys.

At its right hand end the conveyor belt 60 passes outside the casing being arranged to deliver the ground, comminuted and now completely dehydrated product to a container or hopper 65 from which it may be removed for packing and distribution. The product in moving toward the right upon the upper reach of the belt 60 is not only subjected to the current of hot dehydrated gas delivered through the duct 55, but is subjected also to a warm blast delivered through a transverse header 66 which is arranged adjacent to the blade 64, and directs a blast upon the product in the direction of its travel on the belt 60 with the result that small particles of the product or those of reduced specific gravity are picked up and advanced to the delivery outlet of the apparatus at a faster rate than they would be otherwise carried by the belt 60.

As suitable edible wetting agents I may employ any of the lecithin compounds such as those commercially known as "Yelkin C," "Yelkin T" or "Yelkin—T–X15," or the fatty alkali sulphates commercially known as "Teel" or the compounds marketed as "Aerosal AY"—IB or OT. These edible wetting agents are all available in the market as commercial commodities.

The spray pipe 36 or a similar pipe may be utilized to supply to the product in process of dehydration liquid ingredients other and different from the wetting agents above mentioned. For example, vitamin, animal, protein, essential oils, iodine in solution or the like, may be sprayed upon the product and thus distributed throughout it. In the subsequent stages of the process these added ingredients become dried on or within the mass so that the resulting dehydrated product contains new ingredients not found in the original fresh material.

As already noted it is contemplated that in successive steps of the process the product may be advanced at different rates of speed and that the layer of product being treated may be correspondingly varied in depth. For example, it may be assumed in the illustrated apparatus that the belts 41, 50, and 60 are driven at progressively increasing rates of speed and that the product being treated is thus distributed in progressively thinner lays upon these belts. One advantage of the illustrative apparatus is its inherent flexibility in this respect since each of the individual conveyor belts may be driven independently at the speed best suited for the work in hand.

In the chilling step air or gas may be employed at any desired temperature lower than that of the product. The latter may arrive at that stage of the process heated to perhaps 180°–200° F. and under such conditions I have found air at 40°–70° F. to be a very satisfactory medium for chilling and removing surface moisture from the food product. These temperatures are mentioned as illustrative only, and it will be understood that wider different working temperatures are desirable in dehydrating the great range of food products to the treatment of which my novel process may be advantageously applied.

In the chilling step the cold gas admitted to the chilling compartment 40 will, of course, extract heat from the product in passing over it. The energy thus acquired is useful in increasing the capacity of the gas to absorb and carry moisture. In this aspect the process of my invention is characterized by the steps of heating the interior of the product, and cooling the exterior of the product, thereby forcing moisture from the interior to the exterior, and removing moisture from the exterior by a current of gas cooler than the heated interior of the product. Cold $CO_2$ vapor may be supplied in this step of the process from solid $CO_2$ introduced into the compartment 40 as suggested in Fig. 1.

As shown in Figs. 1 and 2 the product treated is represented as being cut-up carrots or other solid type of vegetable and in passing through the rolls 21 the product units are subjected to momentary compression. In Fig. 3 the product is represented as being a leafy product such as spinach and here the effect of the rolls 21 is more in the nature of shredding, tossing and fluffing the product.

It will be seen therefore that by employing the apparatus above described I have provided for carrying out a continuous process which includes air drying and heat drying of the product at various rates of speed in selected portions of the process, agitating and breaking up the mass of the product at suitable intervals, momentarily compressing the product, gradually reducing the particle size of the product during the drying process, regulating the depth of the layer of product being treated and varying it in different parts of the process, subjecting the product to a moisture equalizing step, adding a wetting agent at a selected stage of the process, chilling the partially dehydrated product, and if desired, subjecting it at the same time to radiant heat, all at or below atmospheric pressure, and finally expediting the delivery of fine particles of the dehydrated product from the apparatus.

While I have described my process as being carried out under a slight increase of pressure above atmospheric, and with air or inert gas as a drying medium, I also contemplate that in treating vitamin compounds, blood plasma or the like it may be desirable to carry out the process under vacuum or sub-atmospheric conditions. The appended claims, wherever the text permits, should therefore be construed to include in their scope the practice of the recited step under such reduced pressure conditions.

Having thus disclosed my invention and described in detail one advantageous manner of putting it into practice, I claim as new and desire to secure by Letters Patent:

1. The process of dehydrating a mass of moisture-containing food units, which consists in extracting moisture from the food units by contact of a gas therewith, simultaneously fluffing the units to facilitate the gas contact therewith and subdividing the food units into lesser units having varying specific gravity and thereafter moving the units of less specific gravity at an increased rate during the dehydration thereof.

2. In a food dehydrating process, the steps of advancing a moisture-containing product in a substantially horizontal path upon a flexible conveyor, meanwhile subjecting the product to direct overhead radiation and to heating from beneath, directing a current of dehydrating gas over the product, separating the product from the conveyor by causing it to travel over a sloping scraper, picking up the product as it leaves the scraper, and scattering it in the dehydrating gas current.

3. The process of dehydrating a mass of moisture-containing food product, which consists in moving the product successively in different horizontal paths within an enclosed space, subjecting the product always to currents of arid gas flowing in the same direction as the product, the gas in one path being hotter than the product and in another path being cooler than the product, heating the product by conduction, periodically lifting the product into the gas current, and simultaneously subjecting the product to direct overhead radiation.

4. In a dehydration process, the steps of progressively advancing and fractionating vegetable material to form units of various sizes and shapes while extracting moisture therefrom by contact with a dehydrating gas flowing in the same direction in which the material is advanced, and periodically fluffing the units in the current of the gas thereby moving the lighter particles ahead of the heavier ones.

CLARENCE BIRDSEYE.

REFERENCES CITED

The following references are of record in the file of this patent:

UNITED STATES PATENTS

| Number | Name | Date |
|---|---|---|
| 230,004 | Halvorson | July 13, 1880 |
| 237,003 | Emery | Jan. 25, 1881 |
| 240,581 | Edwards | Apr. 26, 1881 |
| 240,900 | Pickett | May 3, 1881 |
| 265,552 | Abott | Oct. 10, 1882 |
| 514,578 | Whitman | Feb. 13, 1894 |
| 541,652 | Blanchard | June 25, 1895 |
| 596,470 | Blanchard | Jan. 4, 1898 |
| 606,097 | Stauber | June 21, 1898 |
| 708,602 | Welch | Sept. 9, 1902 |
| 717,265 | Passburg | Dec. 30, 1902 |
| 813,265 | Whitman | Feb. 20, 1906 |
| 847,308 | Ayres | Mar. 12, 1907 |
| 980,252 | Hayden | Jan. 3, 1911 |
| 1,446,580 | Perry | Feb. 27, 1923 |
| 1,493,778 | Harrison | May 13, 1924 |
| 1,520,187 | Lawson | Dec. 23, 1924 |
| 1,536,291 | Glessner | May 5, 1925 |
| 1,551,818 | Garnsey | Sept. 1, 1925 |
| 1,602,830 | MacPherran | Oct. 12, 1926 |
| 1,651,293 | Ronsheimer | Nov. 29, 1927 |
| 1,711,729 | Forrest | May 7, 1929 |
| 1,896,984 | Taylor | Feb. 1, 1933 |
| 1,949,427 | McComb | Mar. 6, 1934 |
| 2,042,145 | Darrah | May 26, 1936 |
| 2,074,458 | Cavagnaro | Mar. 23, 1937 |
| 2,110,184 | Webb | Mar. 8, 1938 |
| 2,174,897 | Sackett | Oct. 3, 1939 |
| 2,192,041 | Headland | Feb. 27, 1940 |
| 2,281,184 | Dykstra et al. | Apr. 28, 1942 |
| 2,320,474 | Ross | June 1, 1943 |
| 2,324,914 | Dickinson et al. | July 20, 1943 |
| 2,329,600 | Freund | Sept. 14, 1943 |

FOREIGN PATENTS

| Number | Country | Date |
|---|---|---|
| 491,735 | Great Britain | Sept. 8, 1938 |
| 209,014 | Great Britain | Jan. 3, 1924 |
| 464,758 | Great Britain | Apr. 20, 1937 |
| 19,919 | Germany | Nov. 7, 1882 |
| 229,909 | Germany | Jan. 10, 1911 |